United States Patent [19]

Pircher et al.

[11] 4,429,199
[45] Jan. 31, 1984

[54] THREE-POLE CABLE CONNECTING UNIT FOR A THREE-POLE METAL-ENCAPSULATED, HIGH-VOLTAGE SWITCHING INSTALLATION

[75] Inventors: Christian Pircher; Jürgen Schoeps, both of Berlin, Fed. Rep. of Germany

[73] Assignee: Siemens AG, Berlin and Munich, Fed. Rep. of Germany

[21] Appl. No.: 391,143

[22] Filed: Jun. 23, 1982

[30] Foreign Application Priority Data

Jul. 2, 1981 [DE] Fed. Rep. of Germany ....... 3126745

[51] Int. Cl.³ ..................... H01H 33/54; H02B 1/04
[52] U.S. Cl. ............................ 200/148 R; 200/148 F; 361/335; 361/341
[58] Field of Search ........... 200/148 R, 148 F, 144 R; 361/335, 331, 332, 341

[56] References Cited

U.S. PATENT DOCUMENTS 3,886,336  5/1975  Boersma et al. ............... 200/148 R
3,987,260 10/1976  Wilson ........................... 200/148 R
4,241,379 12/1980  Olsen .............................. 361/335

Primary Examiner—Robert S. Macon
Attorney, Agent, or Firm—Karl F. Milde, Jr.; Andrew G. Rodau

[57] ABSTRACT

A three-pole cable connecting unit for a compressed gas-insulated high-voltage switching installation is disclosed having three cable connecting elements, a three-pole isolating switch and (optionally) a three-pole ground mechanism, as well as two three-phase conductor branches, all lying encapsulated within a housing. To make the housing as small as possible, the three cable connecting elements are introduced into the receptacle at the end wall in a generally parallel fashion to connect with the fixed contacts of the isolating switch. The isolating switch is generally arranged in a plane which lies at right angles to the diametrical longitudinal plane of the housing. The isolating gaps of the switch are inclined toward each other. From the contacts of the isolating switch, connecting conductors fan out toward a conductor branch at the housing side in such a way that they lie at the tips of an equilateral triangle. Likewise, other connecting conductors fan out toward a second conductor branch at the housing end wall where they also lie at the tips of an equilateral triangle. The actuation of the contact pins of the isolator switch occurs from a drive shaft arranged parallel to the diametrical longitudinal plane in the manner of a chord.

9 Claims, 6 Drawing Figures

THREE-POLE CABLE CONNECTING UNIT FOR A THREE-POLE METAL-ENCAPSULATED, HIGH-VOLTAGE SWITCHING INSTALLATION

BACKGROUND OF THE INVENTION

1. Field of the Invention

The invention relates to a three-pole cable connecting unit for a three-pole metal-encapsulated, compressed gas-insulated high-voltage switching installation, wherein the three cable connecting elements are introduced into a housing forming the encapsulation. Within the encapsulation are also disposed a three-pole isolating switch and possibly a three-pole ground. In addition one or two three-phase conductor branches are provided, the connecting planes of which, leading out of the housing wall, are perpendicular to each other, one conductor branch lying on an end wall of the housing.

2. Description of the Prior Art

A high-voltage switching installation of the type to which the present invention relates is described in U.S. Pat. No. 4,241,379 (which corresponds to German Offenlegungsschrift DE-OS No. 27 54 691). This multiphase, metal-encapsulated, compressed gas-insulated high-voltage installation is composed of three different housing types forming the encapsulation. All switch gear and current-carrying parts associated with a bus bar are lodged in a first housing; a second housing contains the circuit breakers and associated current-carrying parts; and a third housing contains all gear required on the terminal side and associated current-carrying parts, such as isolating switches, cable connecting elements and possibly ground connections. This construction is used so that all of the different field circuits of a high-voltage switching installation can be assembled in modular form, leading to substantial simplification in manufacture and stockkeeping of the individual housing types.

SUMMARY OF THE INVENTION

It is the object of the invention to provide a three-pole cable connecting unit for such a three-pole, metal-encapsulated, compressed gas-insulated high-voltage switching installation which is designed in such a way that the dimensions of the housing forming the encapsulation are as small as possible.

In accordance with the invention, a three-pole cable connecting unit is formed in such a way that the three cable connecting elements are introduced into the cylindrical housing on the end wall. The elements are generally arranged in a plane parallel to the diametrical longitudinal plane of the housing and connect to fixed contacts of the three-pole isolating switch which are arranged generally in a plane lying at right angles thereto. The movable contacts lie in this plane also, the isolating gaps in this plane being bridged by contact pins which extend at angles to each other. Connecting conductors lead away from the isolating switch contacts in such a way that at the conductor branch leading out of the housing wall, the connecting conductors are positioned at the tips of an approximately equilateral triangle.

In a cylindrical housing, therefore, the cable connecting elements and a three-phase conductor branch are arranged on the end walls and another three-phase conductor branch is arranged perpendicular thereto on the cylindrical wall. The connecting conductors are brought into the housing 1 from their equilateral triangle arrangement at the conductor branches to the generally parallel arrangement of the cable connecting elements, which permits the height of the housing to be small, since the three-pole isolating switch can be placed into a plane extending perpendicular to the diametrical longitudinal plane of the housing. For this reason, the driving mechanism for the contact pins and for the contacts of the optionally present ground mechanism can be of simple design and also located within the housing. The isolating gaps are inclined toward one another within the plane of the isolating switch.

The bent connecting conductors of the end wall conductor branch and the bent connecting conductors in the front wall conductor branch, which originate either from the fixed or from the movable contacts of the isolating switch, are advantageously of identical construction, which greatly simplifies stockkeeping. Yet they form the tips of an approximately equilateral triangle in the conductor branch.

The contact pins per phase of the three-pole isolating switch and their actuating mechanisms on high-voltage potential as well as the fixed contacts of the isolating switch and those of the possibly present ground, are preferably fastened to the housing by insulators. It is especially expedient to use a shaft extending parallel to the diametrical longitudinal plane of the housing in the manner of a chord as a drive mechanism for the contact pins of the three-pole isolating switch. The drive shaft of the optional ground is also preferably parallel thereto.

BRIEF DESCRIPTION OF THE DRAWINGS

The invention is explained in more detail below with reference to the embodiments illustrated in FIGS. 1–6 of the drawings in which.

DESCRIPTION OF THE PREFERRED EMBODIMENTS

Figure 1:
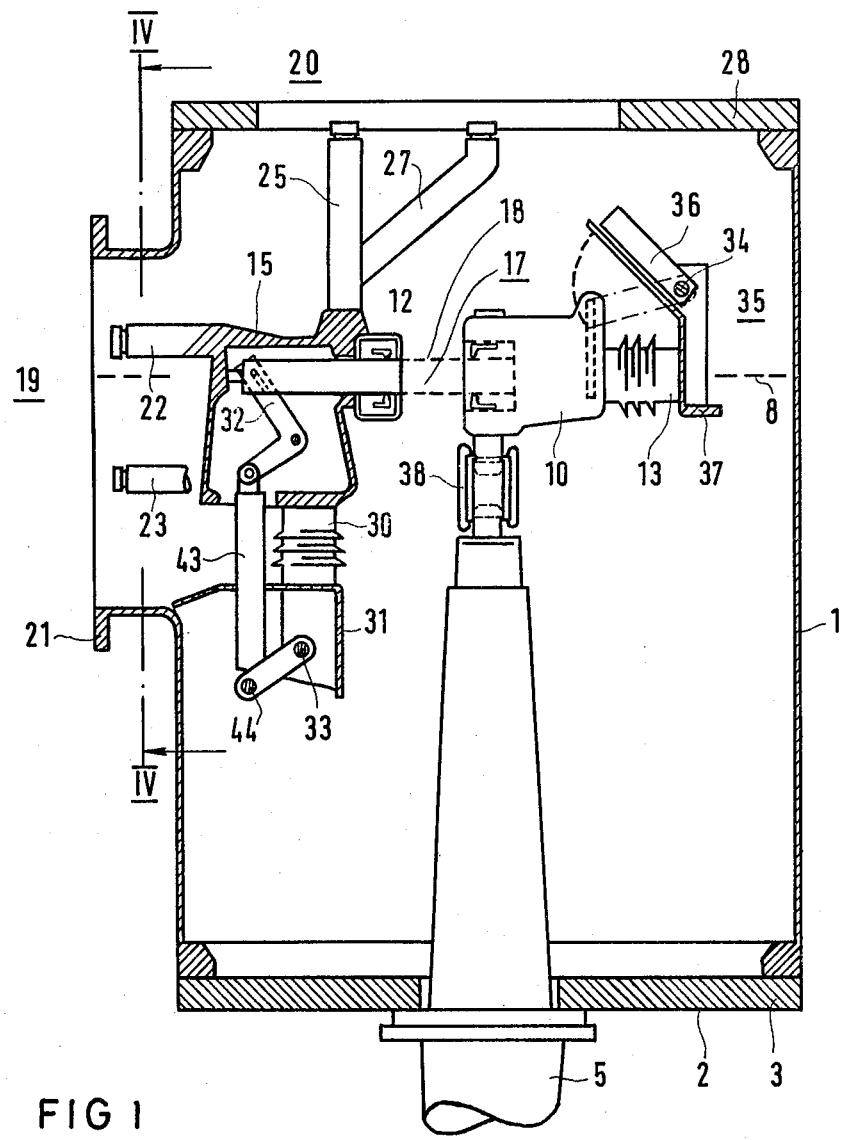
FIG. 1 is a longitudinal section view of a cable connecting unit designed according to the invention.
Figure 4:
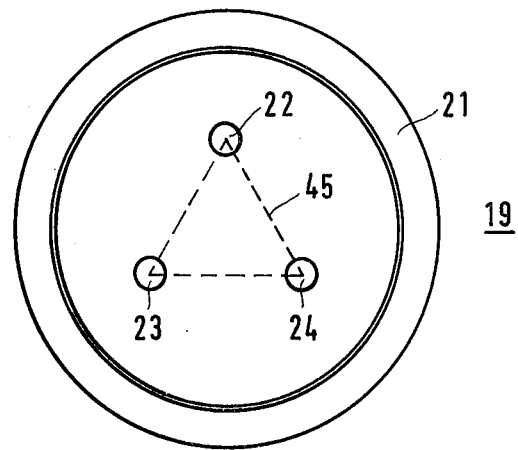
FIG. 4 is a section view taken along the line IV—IV in FIG. 1.
Figure 3:
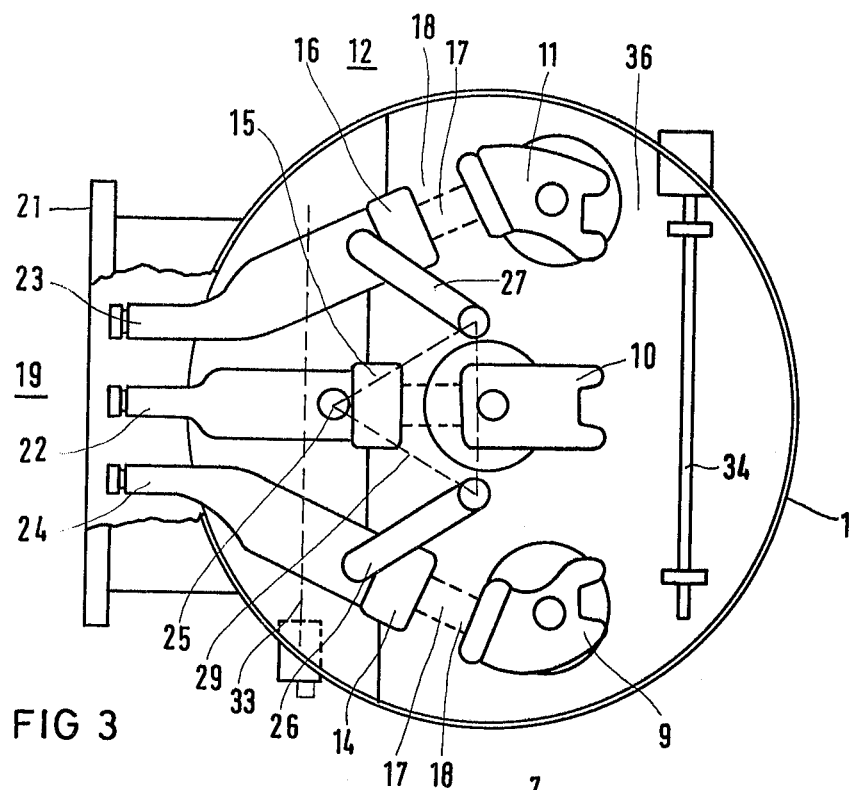
FIG. 3 is a top plan view showing the upper end wall of the unit of FIG. 1.
Figure 2:
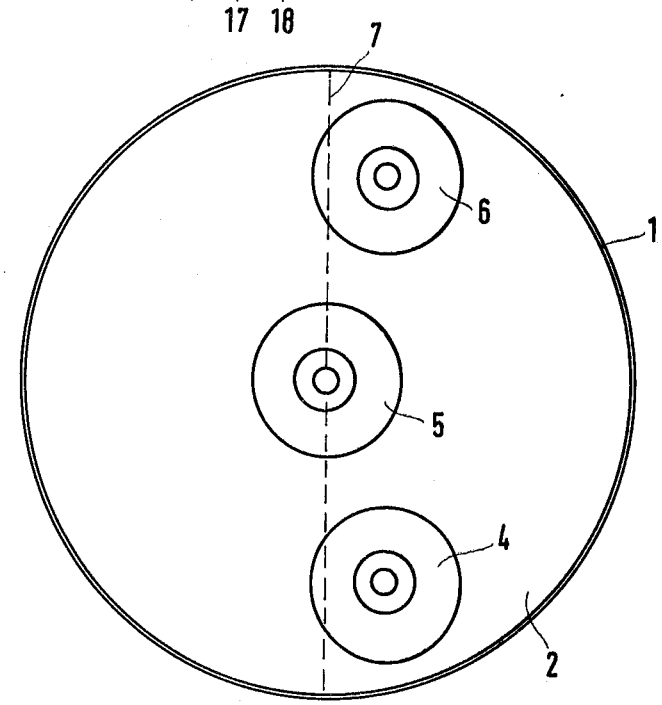
FIG. 2 is a bottom plan view showing the lower end wall of the unit of FIG. 1.

FIGS. 1–4 show an embodiment of a three-pole cable connecting unit housed within a metallic cylindrical housing 1 which forms an encapsulation for the unit. The encapsulation is closed at its lower end wall 2 by a gas-tight cover 3, through which three cable connecting elements 4, 5 and 6 pass. As shown in FIG. 2, the cable connecting connecting elements 4, 5 and 6 are positioned side-by-side so that they lie generally in a plane extending parallel to the diametrical longitudinal plane 7 (shown by dashed lines in FIG. 2) of the housing 1. The elements 4, 5 and 6 serve to guide cables respectively to the fixed contacts 9, 10 and 11 (see FIG. 3) of a three-pole isolating switch 12. The contacts 9, 10 and 11 are arranged in a plane 8 (shown by dashed lines in FIG. 1) which is at right angles to the plane 7. Each of the contacts 9, 10 and 11 is fastened to the housing 1 by means of an insulator 13. The movable contacts 14, 15 and 16 of the three-pole isolating switch 12 also lie within the plane 8. The isolating gaps 18 in plane 8 are bridgeable by the contact pins 17 (indicated in broken lines in FIG. 3) which extend at angles relative to one another.

In the embodiment of FIGS. 1-4, two connecting conductors extend from each of the movable contacts 14, 15 and 16 of isolating switch 12 in fanned-out fashion to the three-phase conductor branches 19 and 20. The conductor branch 19 is passed through the cylindrical wall of the housing 1 by means of the flange 21 (see FIGS. 1, 3 and 4). The branch 19 comprises three connecting conductors 22, 23 and 24 which are fanned out from the movable contacts 14, 15 and 16 that lie generally parallel and side-by-side in plane 8, in such a way that at the conductor branch 19 the conductors 22, 23 and 24 are relatively positioned at the tips of an approximately equilateral triangle 45 (as shown by dashed lines in FIG. 4). The other three connecting conductors 25, 26 and 27 also originating from the movable contacts 14, 15 and 16, respectively, lead to the three-phase conductor branch 20 which lies in the upper end wall 28 of the housing 1. The conductors 25, 26 and 27 are fanned out so that at the conductor branch 20, they too lie at the tips of an approximately equilateral triangle 29 (shown by dashed lines in FIG. 3).

Each movable contact 14, 15 and 16 of the isolating switch 12 is fastened within the housing 1 by an insulator 30 mounted on a support 31. The insulator 30 also supports the driving mechanism arranged within the housing 1 for the conact pins 17 of the isolating switch 12. The pin driving mechanism comprises an angle lever 32, an insulating rod 43, a lever 44 and a drive shaft 33. These elements are articulated as shown in FIG. 1, so that when the drive shaft 33 is pivoted, the lever 32 drives the pin 17 linearly. The drive shaft 33 extends parallel to the diametrical longitudinal plane 7 in the manner of a chord (as indicated by dashed lines in FIG. 3).

A drive shaft 34 for a grounding mechanism 35 is positioned parallel to the drive shaft 33 of the isolating switch 12. The grounding mechanism comprises movable contacts 36 that serve to ground the fixed contacts 9, 10 and 11 of the isolating switch 12. The grounding mechanism 35 is disposed on the support 37 which serves to fasten the insulators 13 of the fixed contacts 9, 10 and 11 of the isolating switch 12 inside the housing 1.

To avoid the introduction of forces from the cable connecting elements 4, 5 and 6 to the isolating switch 12 and vice versa, the connection between the fixed contacts 9, 10 and 11 of the isolating switch 12 and the cable connecting elements 4, 5 and 6 is established by means of a coupling contact 38 which prevents the transmission of mechanical forces.

Figure 5:
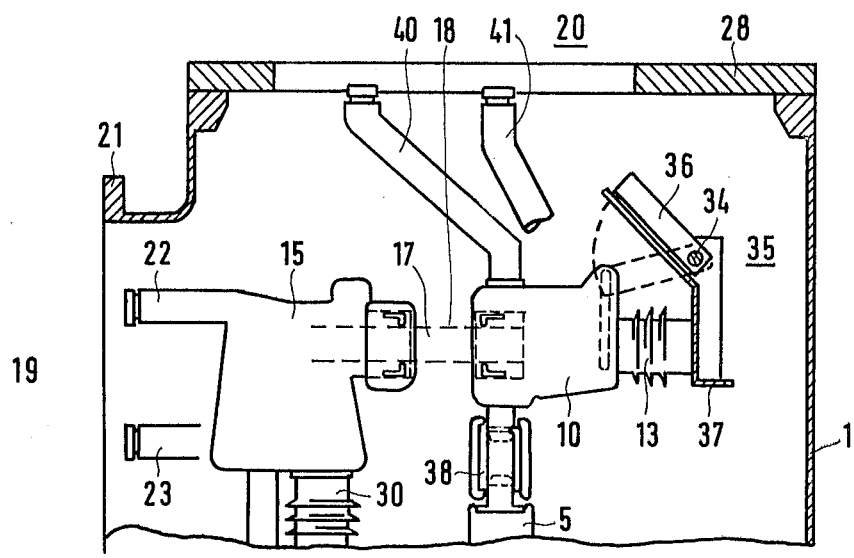
FIG. 5 is a view partly in section of a modified form of the unit of FIG. 1, shown in a view similar to the upper half of FIG. 1.
Figure 6:
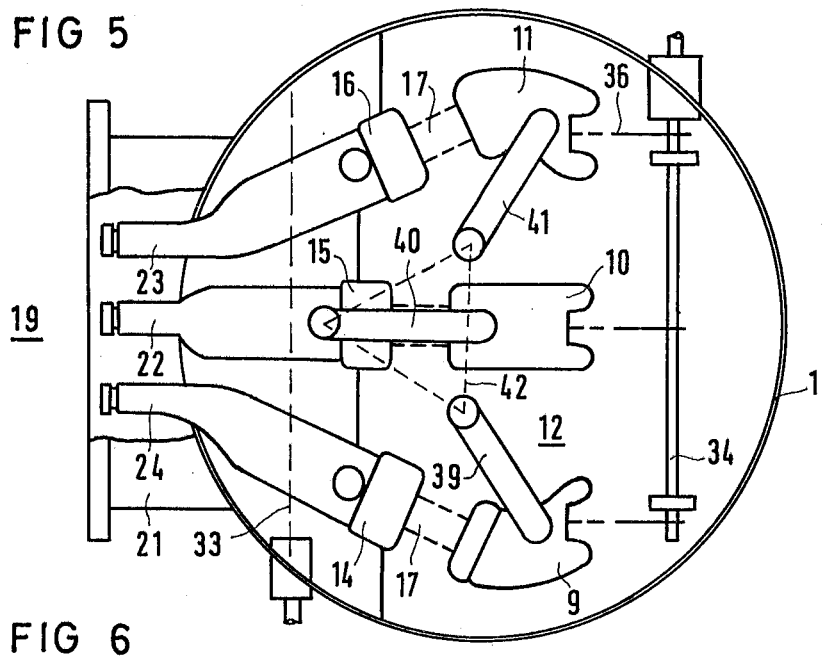
FIG. 6 is a view corresponding to FIG. 3 of the modified unit of FIG. 5.

In the modified form of three-pole cable connecting unit (shown in FIGS. 5 and 6), the three-phase conductor branch 20 brought out at the upper end wall 28 is formed by three connecting conductors 39, 40 and 41 which connect with the fixed contacts of the isolating switch 12. Conductor 39 is connected with the fixed contact 9, conductor 40 with the fixed contact 10 and conductor 41 with the fixed contact 11. Starting from these fixed contacts 9, 10 and 11, the connecting conductors 39, 40 and 41 are fanned out so that they lie in the conductor branch 20 at the tips of an approximately equilateral triangle 42 (as shown by dashed lines in FIG. 6).

In both of the embodiments discussed above for simplified stockkeeping, the bent connecting conductors 26, 27 leading to the movable contacts 14, 16 in FIG. 1 of the isolating switch 12 and the bent connecting conductors 39, 40 and 41 leading to the fixed contacts 9, 10 and 11 (FIG. 5), are all of the same construction. In each case, the arrangement of these conductors in the conductor branch 20 takes the general form of an equilateral triangle 29, 42. The connecting conductor 25, originating from the movable contact 15, is a straight pipe section.

Having thus described the invention with particular reference to the preferred forms thereof, it will be apparent to those skilled in the art to which the invention pertains, after understanding the invention, that various changes and modifications may be made therein without departing from the spirit and scope of the invention as defined by the claims appended hereto. It will be appreciated that the selection, connection and layout of the various components of the described configurations may be varied to suit individual tastes and requirements.

What is claimed is:

1. A three-pole cable connecting unit for a three-pole metal encapsulated, compressed gas-insulated high voltage switching installation, comprising:

a housing having side and end walls and forming an encapsulation;

a three-pole isolating switch having three fixed and three movable contacts, all generally arranged in a switch plane, contact pins angled relative to one another respectively for selectively connecting pairs of fixed and movable contacts; and drive mechanisms for actuating the pins; three cable connecting elements introduced into the housing at an end wall thereof and respectively going to the fixed contacts of the switch, the elements being generally arranged in a plane which is parallel to a diametrical plane of the housing and perpendicular to the switch plane;

a first three-phase conductor branch leading out of a wall of the housing at a first connecting plane; and a first set of three connecting conductors respectively leading from one of the fixed contact and moving contact of each contact pair to the first conductor branch, the first set of conductors fanning out so that at the first connecting plane, they lie relative to one another at the tips of a first equilateral triangle.

2. A cable connecting unit as defined in claim 1, wherein the first three-phase conductor branch leads out of an end wall of the housing, and futher comprising a second three-phase conductor brance leading out of the side wall of the housing at a second connecting plane; and a second set of three connecting conductors respectively leading from the moving contacts of each conductor pair to the second conductor branch, the second set of conductors fanning out so that at the second connecting plane, they lie relative to one another at the tips of a second equilateral triangle.

3. A cable connecting unit as defined in claim 1 or 2, further comprising a three-pole ground mechanism for grounding the fixed contacts of the isolating switch.

4. A cable connecting unit as defined in claim 1, further comprising first insulators for fastening each contact pin of the isolating switch and its associated drive mechanism to the housing.

5. A cable connecting unit as defined in claim 4, further comprising second insulators for fastening each fixed contact of the isolating switch to the housing.

6. A cable connecting unit as defined in claims 1 or 2, wherein the drive mechanisms have a common drive shaft for actuating the contact pins, the drive shaft extending parallel to the diametrical longitudinal plane in the manner of a chord.

7. A cable connecting unit as defined in claim 6, further comprising a three-pole ground mechanism for grounding the fixed contacts of the isolating switch, the ground mechanism including a ground actuating shaft which extends parallel to the drive shaft.

8. A cable connecting unit as defined in claim 1 or 2, wherein the respective connections of the cable connecting elements to the fixed contacts are established through coupling contacts which cannot transmit any mechanical forces.

9. A cable connecting unit as defined in claim 1 or 2, wherein the first set of connecting conductors comprises a plurality of bent conductors of identical construction.

* * * * *